United States Patent
Fielder et al.

[11] Patent Number: 5,829,181
[45] Date of Patent: Nov. 3, 1998

[54] JUGFISHING APPARATUS

[76] Inventors: L. Mark Fielder, 527 Hwy. 30; James M. Collins, 112 Orchard Dr., both of Eufaula, Ala. 36027

[21] Appl. No.: 727,748

[22] Filed: Oct. 8, 1996

[51] Int. Cl.[6] .................................................. A01K 93/00
[52] U.S. Cl. .................................................................. 43/17
[58] Field of Search ................................ 43/17, 16, 17.5; 116/107

[56] References Cited

U.S. PATENT DOCUMENTS

| | | | |
|---|---|---|---|
| 2,722,763 | 11/1955 | Miner et al. | 43/17 |
| 3,656,251 | 4/1972 | Snider et al. | 43/17 |
| 4,486,969 | 12/1984 | Swenson | 43/17 |
| 4,660,316 | 4/1987 | Gamelin | 43/17 |
| 4,809,456 | 3/1989 | Caparelli, Jr. et al. | 43/17 |
| 4,884,355 | 12/1989 | Neihoff et al. | 43/17 |
| 5,036,615 | 8/1991 | Lu | 43/17.5 |
| 5,228,228 | 7/1993 | Meissner | 43/17 |

*Primary Examiner*—Daniel D. Wasil

[57] ABSTRACT

A jugfishing apparatus and signaling device for indicating to a jugfisherman that a fish has struck the bait. The signaling device can include an illumination device such as a light bulb, or an audible signal. When a fish strikes the bait, the signaling device is activated and remains so until de-activated by the fisherman. The force necessary to trigger the signaling device can be adjusted along a continuous range for a variety of fishing conditions, to implement different fishing tactics, and to allow the use of any of a number of standard-size buoyant containers.

17 Claims, 4 Drawing Sheets

JUGFISHING APPARATUS

BACKGROUND OF THE INVENTION

1. Field of the Invention

The present invention relates generally to a fishing device, and more specifically to a jugfishing apparatus which includes illumination means which is activated when a fish is hooked and which illumination means is thereafter maintained in an illuminated state until the apparatus is retrieved and switched off.

2. Description of Related Art

Jugfishing is a variety of sport fishing which is becoming increasingly popular. More and more participants, of all ages and from all walks of life, are enjoying jugfishing. In addition to individual participation, jugfishing tournaments have been organized, allowing jugfishermen to compete and to socialize and share strategies with one another, and to introduce the sport to a wide audience of potential jugfishermen. As participation in the sport increases, the market for improved jugfishing equipment is expected to develop accordingly.

In jugfishing, a baited hook is attached to a buoyant device, such as an empty plastic soft drink bottle, and the assembly then is placed into a body of water. When a fish strikes the bait, the buoyant device or "jug" is pulled into the water, the motion of the jug signaling the fisherman of a strike. The buoyancy of the jug also imparts an upward force on the hook, thereby serving to set the hook in the fish's mouth. The fisherman then retrieves the jug and, hopefully, the fish as well.

Typically, a fisherman will bait and place a number of jugfishing assemblies into the water and periodically monitor the jugs for activity. Because jugfishing commonly takes place at night, darkness hinders the jugfisherman's ability to effectively monitor his jugs for movement which would indicate a fish strike. Typically, the jugfisherman will mark his jugs with fluorescent tape or paint, and will monitor the jugs using a spotlight. The use of a spotlight to monitor the jugs, however, has been found to attract insects, which may bite and annoy the fisherman or cause potential health risks to the fisherman. The use of a spotlight also tends to frighten fish away from the fishing area.

It also has been discovered that jugs are often difficult to see in the water at night, even with the assistance of fluorescent markings and a spotlight. Because of this difficulty in observing jugs, fishermen frequently use fewer jugs and fish a smaller area than otherwise would be desired. The difficulty in observing jugs also may allow fish to release themselves from the hook before the fisherman notices movement of the jug. This reduces the fisherman's catch, and furthermore, may result in an unbaited jug assembly remaining in the water indefinitely, further reducing the fisherman's productivity.

There is also some possibility that a fish could be hooked on a jugfishing apparatus and swim away unnoticed, with the jug in tow, never to be retrieved by the fisherman. If the fish is unable to release itself from the hook, the fish will most likely die as a result. Moreover, even if the fish is able to release itself from the hook, it is unlikely that the jugfishing apparatus will be retrieved by the fisherman. In this event, the jugfishing apparatus is left behind to litter the body of water. A related problem may result from a fish pulling the jugfishing apparatus completely or partially underwater and tangling the fishing line on a submerged limb or other underwater object. Unless the fisherman happens to be shining the spotlight on the jug as it is pulled underwater, the jug generally will not be missed, and therefore will not be retrieved. Even if the fisherman counts his jugs when through fishing and then realizes that one or more jugs is missing, the missing jugs may be difficult or impossible to locate.

One popular aspect of jugfishing is that the typical jugfishing apparatus is very inexpensive—typically comprising only an empty soft drink bottle, a length of fishing line, and a hook. This very feature, however, has been found to have undesirable side effects. Because of the small expense involved, some jugfisherman are less than conscientious in retrieving their jugs when they are through fishing. Persons who later see abandoned jugfishing devices littering the water are left with a negative impression of jugfishing, and jugfishermen as a whole, due to the lack of consideration of a small minority of jugfishermen. Thus, it would create a greater incentive to more conscientiously retrieve one's jugs if there were some small, though noticeable, expense involved in the loss or abandonment thereof.

A number signaling apparatuses for indicating a fish strike have been described. For example, U.S. Pat. No. 4,809,456 to Caparelli Jr. et al. describes an apparatus for signaling a fish strike, which apparatus utilizes a lighted signal which is activated when a removable plug is pulled from the unit by a fish striking the hook. Devices of this variety have been found less than fully satisfactory in use for several reasons. First, the activation mechanism for energizing the signaling means comprises numerous parts, and has been found to be unduly complex. It has also been found that the Caparelli Jr., et al. device is difficult to adjust to effectively control the amount of resistance required to activate the signal. The adjustment mechanism of this device requires installation or removal of O-rings on a removable pull pin. This limits adjustability to a limited number of discrete settings, and does not enable continuous adjustment. This adjustment mechanism also requires the fisherman to keep track of numerous small parts, such as O-rings, which are easily lost and difficult to locate, especially in the relative darkness commonly encountered during jugfishing. An additional drawback to the Caparelli Jr. et al. apparatus is the necessity for removing the casing from the jug to remove or replace the batteries.

Other devices, such as the lighted fishing bobbers or floats shown by, for example, U.S. Pat. No. 4,486,969 to Swenson, U.S. Pat. No. 4,884,355 to Neihoff, et al. and U.S. Pat. No. 5,036,615 to Lu, also have been found to be less than finally satisfactory in achieving the objectives addressed by the present invention. From the descriptions provided, these references appear more suited to "rod-and-reel" fishing, rather than for jugfishing. Additionally, although the devices disclosed by each of these references may incorporate a signal light, it appears that the signal lights of each of these devices will not remain illuminated after a fish strike unless the fish continues to pull on the hook. Thus, unless the fisherman is monitoring the bobber at the instant of the fish strike, the fisherman will be unaware of the possibility that the fish has stolen the bait from the hook. In this event, an unbaited and, therefore, nonproductive hook may remain in the water indefinitely.

A variety of other devices for sensing a fish strike are also known. For example, U.S. Pat. No. 5,228,228 to Meissner discloses a motion detection device for mounting at or near the tip of a fishing rod and indicating a fish strike. U.S. Pat. No. 4,660,316 to Gamelin discloses a device which is attached to a rod driven into the ground, and including a clamp for engaging a fishing line to sense a fish strike. These devices, as well as others of this variety, are unsuitable for use in jugfishing, as they generally are adapted only for use in connection with a rod and reel.

Thus it can be seen that a need yet exists for a jugfishing apparatus which noticeably signals the fisherman of a strike by a fish, so that the fisherman can quickly retrieve the fish or rebait the hook as necessary, in order to maximize the fisherman's productivity.

A need further exists for a jugfishing apparatus which, when triggered by a fish strike, remains readily observable, without the need for a spotlight, and even in the event that the jug has been pulled underwater.

Likewise, a need exists for a jugfishing apparatus which enables jugfisherman to monitor a greater number of jugs distributed over a wider area of water, thus increasing the fisherman's chances of success.

A need also exists for a jugfishing apparatus which provides for adjustment by the fisherman, within a continuous range, of the triggering force required to be imparted on the hook by a fish to activate the signal.

A need further exists for a jugfishing apparatus which incorporates a means for signaling the fisherman of a fish strike, even if the fish was not hooked or has released itself from the hook, so that the fisherman can check to see if the hook needs rebaiting.

It has also been found that a need exists for such a jugfishing apparatus as described above, which is inexpensive, but which requires at least some minimal monetary expenditure by the fisherman, thereby encouraging more diligent recovery efforts by the fisherman and minimizing litter due to the abandonment of jugs.

It is to the provision of a jugfishing apparatus meeting the above-identified needs that the present invention is primarily directed.

SUMMARY OF THE INVENTION

The present invention satisfies these and other needs of jugfishermen by providing a jugfishing device having an indicating means for alerting the fisherman of a fish strike. Briefly described, in one preferred form, the jugfishing apparatus of the present invention comprises an indicating means which can be sealed within a buoyant vessel such as an empty plastic soft drink bottle. The indicating means preferably comprises a light bulb, one or more energy storage batteries, and a switch mechanism which enables the light bulb to be switched on or off.

The apparatus is utilized by attaching a length of fishing line and a fish hook to the switch mechanism, baiting the hook, and placing the apparatus in the water with its indicating means switched to the non-energized (light off) position. Because the switch mechanism of the present invention preferably comprises an actuator having a portion extending externally of the remainder of the apparatus, the fishing line can be attached externally, without disassembly. When the bait is struck by a fish, the force of the strike is transmitted through the line to switch the indicating means to the energized (light on) state. Because the fishing line is flexible, it can transfer force only in tension, not in compression. The switching mechanism operates in a pull-on/push-off manner. Thus, once the indicating means has been energized, it is highly unlikely that any subsequent struggle by the fish to release itself from the hook will de-energize the indicating means.

When jugfishing at night, a fisherman will immediately notice an illuminated jug, and recognize that a fish has struck the baited hook. The fisherman can then retrieve the jug and, hopefully, a fish as well. Even in the unfortunate event that a fish takes the bait from the hook without being caught, or in the event that a fish bites through or snaps the fishing line, the jug will light and remain lighted, thereby prompting the fisherman to inspect and, if necessary, rebait the hook.

Because a lighted jug is readily apparent at night from a significant distance or even when submerged beneath the water, a fisherman utilizing the jugfishing apparatus of the present invention can effectively monitor a greater number of jugs distributed over a wider fishing area than is possible using presently-known methods and devices.

The present invention can further comprise lights and/or jugs of a variety of different colors to differentiate one fisherman's jugs from those of another. In this manner, several fisherman can fish the same area and, by observing the color of an illuminated jug, will be able to immediately distinguish which fisherman has caught a fish. A similar result may be obtained utilizing clear jugs and uncolored lights, by placing a sheet of colored acetate film or other transparent or translucent colored material between the light bulb and the jug.

The indicating means of the present invention is preferably of a standard size (diameter), which enables the fisherman to readily transfer the indicating means between jugs of various sizes. For example, soft drink bottles are commercially available in 12 ounce, 16 ounce, 20 ounce, 1 liter, 2 liter and 3 liter sizes. The mouths of these bottles are generally of one or two standard opening sizes. For a variety of reasons, some fishermen find large jugs more desirable than small jugs. For example, when fishing for larger or stronger varieties of fish, or when fishing in rougher waters, the greater buoyancy provided by larger jugs is often advantageous. To the extent that one or two standard-sized indicating means can be adapted to jugs of various sizes, the fisherman can customize the jugfishing apparatus to his intended application in a more economical manner.

In one preferred embodiment, the present invention includes means for adjusting the force necessary to trigger the indicating means. It has been found that if a lighted indicating means is illuminated before a fish has fully taken the bait, the light will frighten the fish away from the bait. It has also been found that, when using a live baitfish as bait, if the triggering mechanism for activating the signal is set too lightly, the movement of the baitfish may activate the signal and frighten away the intended quarry.

Because of the wide variety of fishing conditions and tactics encountered in jugfishing, it has been found desirable to provide an adjustment means for varying the triggering force required to activate the signal which adjustment means is continuously adjustable along a wide range of sensitivities. The present invention enables such adjustment through the provision of a sliding friction ring which easily can be set and adjusted during fishing. By correctly setting the triggering device, the signal will not be activated until the fish has fully taken the bait and has pulled a substantial portion of the jug beneath the water's surface. Then, when the signaling means is triggered, the activation of the signal will likely startle the fish. The startled fish then often will hook itself (or further set the hook) by struggling to escape. The buoyancy of the jug will further act to set the hook in the fish's mouth.

Various other embodiments of the present invention are also possible. For example, the above-described lighted indicating means can be replaced with an audible signal generator, thereby enabling use by a blind jugfisherman, or by sighted fishermen in conditions of low visibility.

It is therefore an object of the present invention to provide a jugfishing apparatus which includes means for sensing a strike by a fish, and means for signaling the fisherman when a strike is detected.

It is a further object of the present invention to provide a jugfishing apparatus which enables a jugfisherman to monitor a large number of jugs distributed over a wide fishing area without the necessity of a spotlight.

Yet another object of the present invention is to provide a jugfishing apparatus which signals the fisherman when a fish may have stolen the bait from the hook, so that the fisherman can rebait the hook.

It is another object of the present invention to provide a jugfishing apparatus having some economic value, so that jugfishermen will be encouraged to recover their jugs when they are through fishing, and so that someone finding an abandoned jug will likely retrieve it, thereby reducing litter in the waterways.

Yet another object of the present invention is to provide a jugfishing apparatus which, upon being struck by a fish, emits a signal which can be observed at a significant distance, and even if submerged underwater, and which signal remains activated until switched off by the fisherman.

Still a further object of the present invention is to provide a jugfishing apparatus capable of distinguishing the jugs of various fisherman, so that two or more fishermen fishing in an area can readily identify which of them has caught a fish.

Another object of the present invention is to provide a jugfishing apparatus which can be utilized with jugs of various sizes for use in a variety of conditions and for different fishing applications.

It is also an object of the present invention to provide a jugfishing apparatus having an adjustment means for enabling adjustment, along a continuous range, of the force necessary to trigger the signaling means.

These and other objects, features and advantages of the present invention will become apparent to one skilled in the art upon reading the following detailed description of the preferred embodiments in connection with the attached figures.

DETAILED DESCRIPTION OF THE PREFERRED EMBODIMENTS

Referring now to the drawing figures in which like reference numerals refer to like parts throughout the several views, preferred embodiments of the present invention will now be described.

Figures 1, 2, 3:
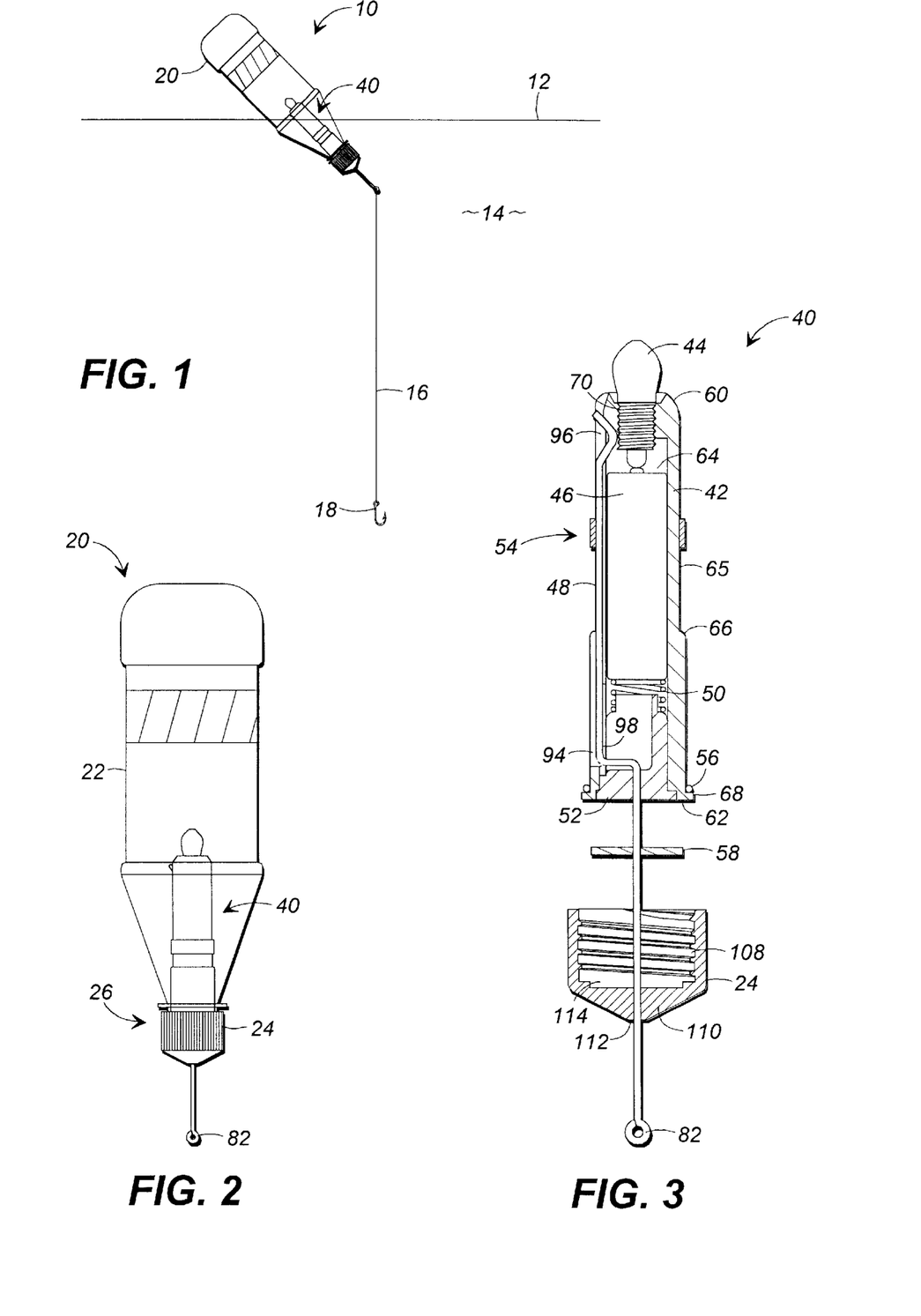
FIG. 1 is a side view showing one embodiment of the jugfishing apparatus of the present invention in situ.
FIG. 2 shows a side view, in greater detail, of a portion of the jugfishing apparatus shown in FIG. 1.
FIG. 3 shows, in cross-sectional detail, a side view of a single-battery, threaded bulb, adjustable tension embodiment of the indicating means of the present invention.

FIG. 1 shows a jugfishing apparatus 10 floating on the surface 12 of a body of water 14. The jugfishing apparatus 10 generally comprises a buoyant vessel 20, means for indicating a fish strike 40, a length of fishing line 16 and a fish hook 18. It will be understood by those of ordinary skill in the art that the fishing line 16 can be of a variety of commercially available materials and test strengths. It will also be understood that the fish hook 18 can be of a variety of sizes and/or configurations, depending upon the size and variety of fish being pursued. Generally, when in use, the fish hook 18 will be baited with some form of live or artificial bait or fishing lure. Various other components of fishing tackle, such as swivels, leaders, weights and the like, may be utilized in connection with the present invention in standard manner.

FIG. 2 shows, in greater detail, a portion of a preferred form of the jugfishing apparatus 10 of the present invention. The buoyant vessel 20 preferably is fabricated from a clear or translucent plastic. In the depicted embodiment, the buoyant vessel 20 comprises an empty soft drink container having a body 22 and a cap 24 over its mouth 26. Alternatively, the buoyant vessel 20 can comprise any body which is sufficiently buoyant to maintain the indicating means 40 at or near the surface 12 of the body of water 14. The outer surface of the buoyant vessel can be provided with markings of fluorescent paint or tape (unshown) for improved visibility.

The buoyant vessel 20 is often referred to as a "jug" and, therefore, using such an apparatus to fish is referred to as "jugfishing." Soft drink containers commonly utilized as the buoyant vessel 20 are readily available in various sizes, including: 12 ounce, 16 ounce, 20 ounce, 1 liter, 2 liters, and 3 liters. When fishing for larger or stronger fish, or when fishing in rougher waters, it has been found that a larger jug provides more acceptable performance, as the greater buoyancy of the larger jug resists submersion due to waves or from being pulled underwater by a fish. The greater "drag" of the larger vessel also makes it more difficult for a hooked fish to swim away, with the jug in tow, to a remote location where the fisherman may not retrieve the fish.

Figure 4:
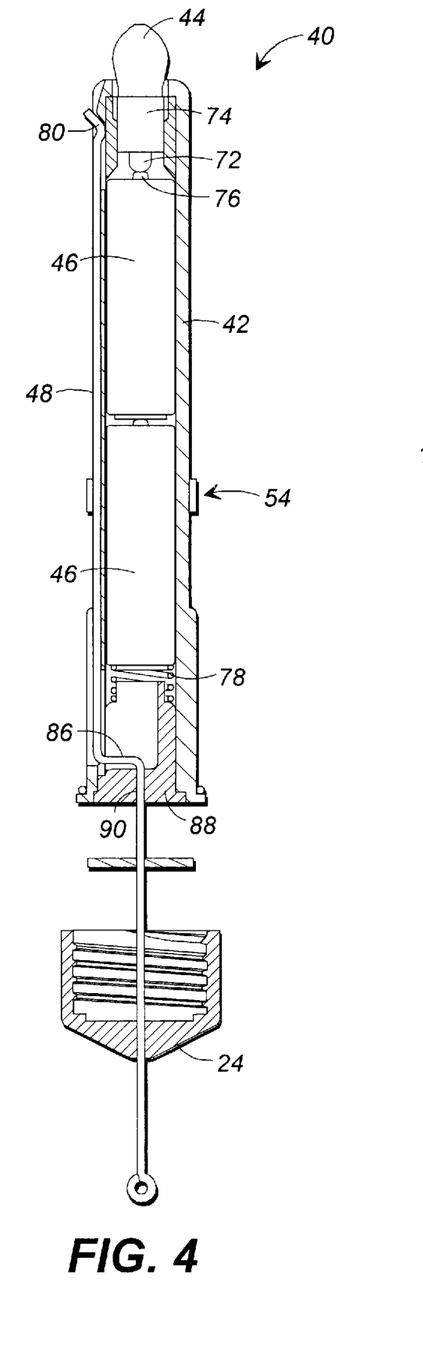
FIG. 4 shows, in cross-sectional detail, a side view of a two-battery, unthreaded bulb, adjustable tension embodiment of the indicating means of the present invention.
Figure 5:
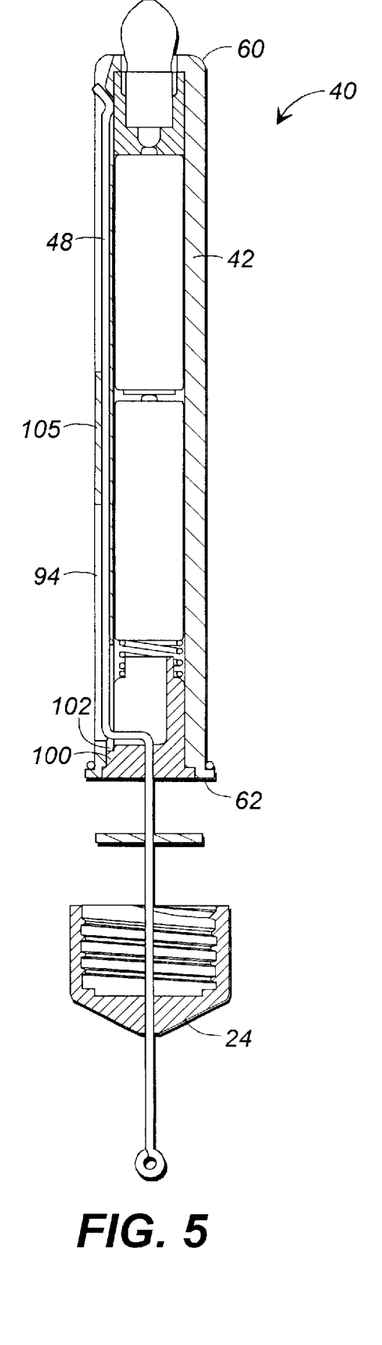
FIG. 5 shows, in cross-sectional detail, a side view of a two-battery, unthreaded bulb, non-adjustable tension embodiment of the indicating means of the present invention.

Indicating means 40 is adapted to be received within the mouth 26 of the buoyant vessel 20, and retained in place with the cap 24. As shown in FIGS. 3–5, a preferred form of the indicating means 40 of the present invention generally comprises a housing 42, a signaling device such as light bulb 44, a power source such as dry-cell battery 46, and an actuator 48. The indicating means 40 can further comprise a retaining spring 50, a ballast 52, and a tension adjustment means 54. Sealing means such as an O-ring 56 and/or a gasket 58 can be provided to prevent water from entering the indicating means 40 and/or the buoyant vessel 20. The components of the jugfishing apparatus 10 and the indicating means 40 of the present invention will be described in greater detail below.

The housing 42 is preferably a generally cylindrical tubular shell constructed of a lightweight, rigid, waterproof and non-conductive material. The housing 42 has a first end 60 and a second end 62. The housing 42 further comprises a chamber 64 extending from adjacent the first end 60 to the adjacent second end 62. The chamber 64 is preferably configured as a cylindrical void having a length and diameter adapted to permit one or more batteries 46 to be introduced therein. The batteries 46 are preferably of a standard size and voltage. Size AA batteries have been found to provide acceptable performance in several embodiments of the present invention when using standard soft drink containers of the 12 ounce, 16 ounce, 20 ounce, 1 liter or 2 liter varieties having a standard-sized mouth opening. It will be understood that, when using other types of buoyant vessels 20, different configurations of the housing 42 may render other battery sizes more preferable. For example, when using 3 liter soft drink containers as the buoyant vessel 20, the wider mouth opening of these containers may more preferably facilitate use with a housing with a diameter adapted to receive C-cell batteries.

In addition to providing a power source for the indicating means 40, the at least one battery 46 can serve to provide additional weight to maintain the jugfishing apparatus 10 in a substantially upright position. In this regard, it has been found that a single-battery indicating means 40, such as shown by FIG. 3, is acceptable for use in connection with smaller buoyant vessels 20, such as 12 ounce or 16 ounce soft drink containers. The greater weight of a two-battery indicating means 40, such as shown by FIG. 4, will provide better performance when used with 16 ounce or larger buoyant vessels 20.

The exterior surface 65 of the housing 42 preferably comprises a generally cylindrical surface having a rounded edge on its first end 60 to facilitate more easy introduction into a buoyant vessel 20. The housing 42 is preferably provided with a shoulder 66 adjacent its second end 62. The shoulder 66 preferably has an outer diameter adapted to be received into the mouth opening of the buoyant vessel 20 with a slight interference fit, in order to maintain the housing in place within the buoyant vessel and to minimize leakage of water along the interface between the housing and the buoyant vessel. A lip 68 can be provided at the second end 62 of the housing 42 to serve as a "stop" when inserting the housing 42 into the buoyant vessel 20. A sealing means such as O-ring 56 can be provided between the lip 68 and the mouth of the buoyant vessel 20 to prevent water from leaking between the two elements.

The indicating means 40 preferably comprises a light bulb 44, or other signaling device such as an LED or an audible signal, which can be switched between a non-activated state and an activated state. As shown in FIG. 3, the light bulb 44 can be attached to the first end 60 of the housing 42 by means of screw threads 70 or, as shown in FIG. 4, by means of a non-threaded connection. The light bulb 44 is typically of the standard flashlight variety, having a tip contact 72 and a ring contact 74, as seen best in FIG. 4. The indicating means 40 can also be provided with a strobe or flasher unit, if desired, to cause the light bulb 44 to continuously flash once activated. When one or more batteries 46 are installed within the housing 42, the tip contact 72 is placed into electrical connection with one of the batteries' electrodes, typically anode 76. A spring 50 can be provided to retain the batteries in position within the chamber 64. As described in greater detail below, the light bulb 44 can be activated by completing an electrical circuit by bringing the cathode 78 of the battery or batteries 46 into electrical contact with the ring contact 74 of the light bulb 44.

Figure 6A:
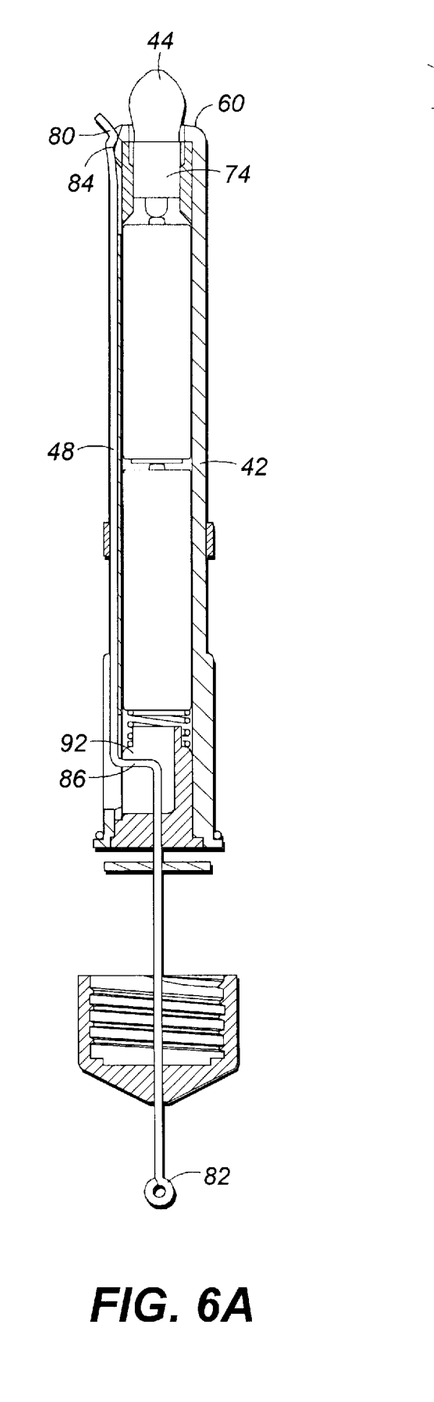
FIGS. 6A and 6B show a two-battery embodiment of the indicating means of the present invention in the non-energized and energized states, respectively.
Figure 6B:
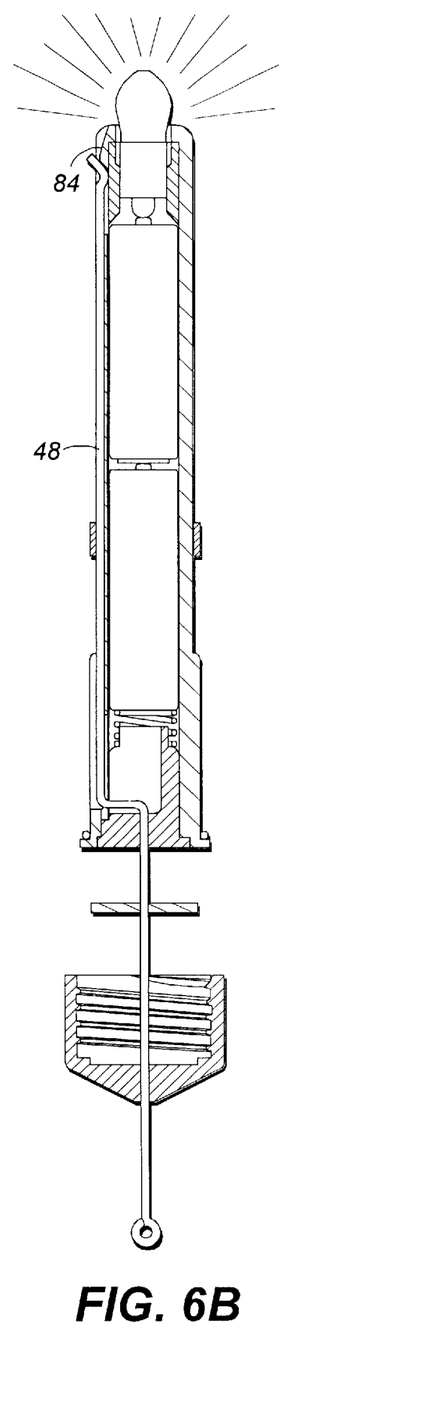
Figure 7A:
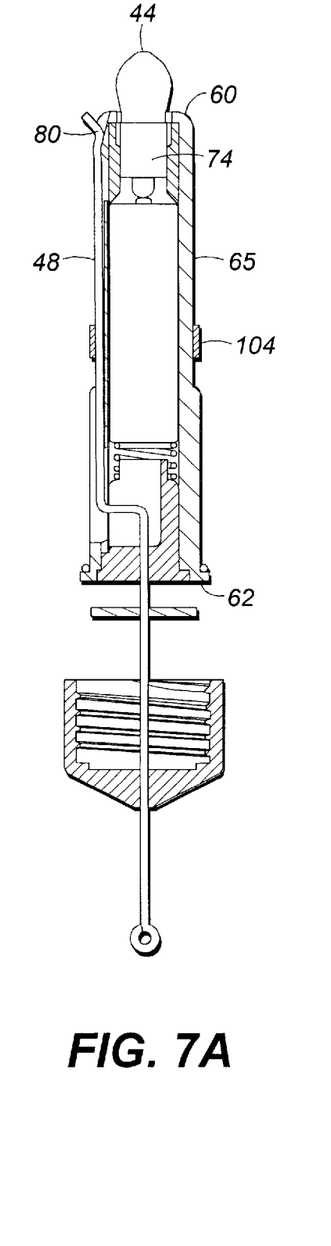
FIGS. 7A and 7B show a single-battery embodiment of the indicating means of the present invention in the non-energized and energized states, respectively.
Figure 7B:
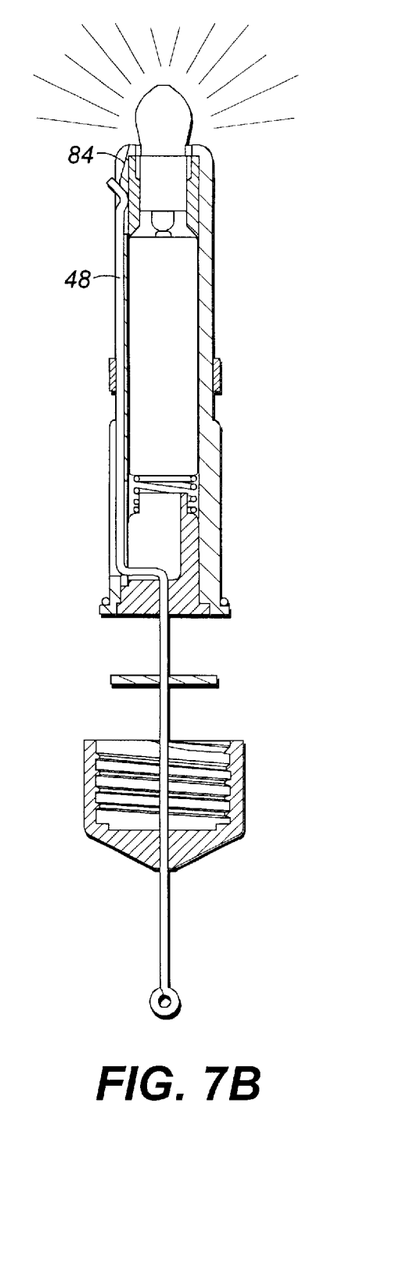

The indicating means 40 preferably includes an actuator 48, movable between a first position as shown in FIGS. 6A and 7A, wherein the signaling device is not activated ("off"), and a second position as shown by FIGS. 6B and 7B, wherein the signaling device is activated ("on"). It will be understood that if the signaling device is a light bulb, the bulb will be illuminated when in the "activated" or "energized" state. Similarly, an audible signaling device will only be audible in the "activated state." The actuator 48 is preferably an electrically conductive, elongate element comprising an upper contact portion 80 at one end, and an eyelet 82 at its other end. As shown in FIG. 1, one end of a length of fishing line 16 will be attached to the eyelet 82, preferably by tying or by means of a swivel. Because the eyelet 82 of the actuator 48 extends externally of the indicating means 40 and the buoyant vessel 20, the fishing line 16 can be replaced or modified without the need for any disassembly of the apparatus. The end of the fishing line 100 opposite the eyelet 82 is connected to a baited fish hook 18 or some type of fish lure. The actuator 48 also includes a lower contact portion 86 which is maintained in electrical contact with one electrode, typically the cathode 78, of a battery or batteries 46 adjacent the second end 62 of the housing 42.

When the actuator 48 is in the first position, as shown in FIGS. 6A and 7A, its upper contact portion 80 is not in electrical contact with the ring contact 74 of the light bulb 44. In this position, the light bulb 44 is in its non-activated state. The first end 60 of the housing 42 comprises an inclined surface 84, which is electrically nonconductive, for maintaining the upper contact portion 80 of the actuator 48 out of electrical contact with the ring contact 74 of the light bulb 44. By providing the upper contact portion 80 of the actuator 48 and the inclined surface 84 of the housing 42 with opposing obliquely angled faces, the upper contact portion 80 engages and slides along the inclined portion 84 of the housing 42 as the actuator 48 is moved back and forth between the first and second positions. As described in greater detail below, means for retaining the upper contact portion 80 against the inclined surface 84, such as a friction ring 104 or a cover 105, are provided to maintain a contact pressure between the two elements throughout the actuator's range of motion.

When the actuator 48 is in the second position, as shown in FIGS. 6B and 7B, its upper contact portion 80 is in electrical contact with the ring contact 74 of the light bulb 44, thereby completing the electrical circuit and causing the light bulb 44 to illuminate. The actuator 48 is preferably fabricated from a flexible metallic bar or wire of sufficient flexibility to permit the actuator to flex as the inclined upper contact portion 80 slides along the inclined surface 84 as the actuator moves between the first and second positions. The actuator must, however, have sufficient stiffness or shape retention to enable the upper contact portion 80 to resiliently spring into contact with the ring contact 74 of the light bulb 44 when the actuator is moved to its second position. In this regard, spring steel has been found to be a satisfactory material of construction for the actuator 48.

Referring again to FIGS. 3–5, the outer surface 65 of the housing 42 is preferably provided with a channel 94 extending from adjacent the first end 60 to adjacent the second end 62. The width and depth of the channel 94 are slightly larger than the maximum outer dimension of the actuator 48, so that the actuator 48 can slide freely within the channel 94 as the actuator 48 is moved back and forth between the first and second positions.

An upper opening 96 is provided at the first end 60 of the housing 42, thereby allowing the upper contact portion 80 of the actuator 48 to extend into the chamber 64 and contact the ring contact 74 of the light bulb 44 when the actuator is moved into the second position. Similarly, a lower opening 98 adjacent the second end 62 allows the lower contact portion 86 to pass from the channel 94 into the chamber 64.

An electrically conductive ballast 88 can be provided between the lower contact portion 86 and the cathode 78 to maintain electrical contact between the actuator and the cathode as the actuator moves back and forth between the first and second positions. The ballast 88 is preferably constructed of lead or some other heavy, electrically-conductive material. It has been found desirable to provide a ballast of sufficient weight to maintain the jugfishing apparatus 10 in a substantially upright position while in use. As seen in FIG. 1, it has been found most preferable to balance the jugfishing apparatus 10 so that its longitudinal axis is maintained at approximately a 45° angle to the vertical. In this manner, the fisherman may be able to observe the jug swiveling or gyrating if a fish begins to play with the bait. This may provide the fisherman with some advance notice of a strike, prior to activation of the signaling means. A heavier ballast 88 is required to maintain a larger buoyant vessel in such a substantially upright position.

The ballast 88 preferably comprises a hole 90 through which the lower end of actuator 48 can pass with a sliding fit. As best seen in FIG. 6A, the ballast 88 also comprises a slot or groove 92 to permit the lower contact portion 86 of the actuator 48 to slide therein as the actuator is moved back and forth between its first and second positions. The slot 92 in the ballast 88 aligns with the lower opening 98 in the housing 42 to permit the lower contact portion 86 to pass through. In order to prevent the lower contact portion 86 of the actuator 48 from binding, it is preferable to provide a "key-and-keyway" arrangement between ballast 88 and the housing 42 to prevent the ballast 88 from rotating within the housing 42. As seen best in FIG. 5, a key 100 can be provided, projecting outward from the ballast 88. A corresponding keyway 102 for receiving the key 100 can be provided in the chamber 64. The interior surface of the housing 42 is preferably provided with a groove, which can comprise an extended portion of the keyway 102, for receiving a portion of the actuator 48, so that the actuator can be moved out of the way to facilitate removal of the battery or batteries 46 from the chamber 64.

The indicator means 40 preferably further comprises a tension adjustment means 54 for varying the triggering force necessary to move actuator 48 from the first position to the second position. In preferred form, the tension adjustment means enables continuous adjustment, within a range, of the triggering force. As shown in FIGS. 7A and 7B, the tension adjustment means preferably comprises a friction ring 104 slidably mounted on the exterior surface 65 of the housing 42. A readable scale (unshown) can be provided along the exterior surface 65 for indicating the position of the friction ring 104. The friction ring 104 serves to retain the portion of the actuator 48 beneath the friction ring 104 within the channel 94. Thus, only the portion of the actuator 48 between the friction ring 104 and the upper contact portion 80 is free to flex as the upper contact portion 80 traverses the inclined surface 84 when the actuator moves between the first and second positions.

By moving the friction ring 104 toward the first end 60, the length of the portion of the actuator 48 which can flex is reduced. With the friction ring 104 moved toward first end 60, the effective stiffness of the actuator increases and, therefore, the contact pressure between the upper contact portion 80 and the inclined surface 84 when the actuator is in the first position will be increased. This increased contact pressure results in an increased frictional force between the upper contact portion 80 and the inclined surface 84, which must be overcome in order to move the actuator from the first position to the second position. Thus, by moving the friction ring 104 toward the first end 60, a greater triggering force is necessary to move the actuator 48 from the first position to the second position and activate the signaling means. Conversely, by moving the friction ring 104 toward the second end 62, the triggering force is reduced. Because the friction ring 104 can be positioned anywhere within a continuous range along the exterior surface 65 of the housing 42, between the shoulder 66 and adjacent upper contact portion 80, continuous adjustment of the triggering force required to activate the signaling means is enabled.

Alternatively, a non-adjustable indicating means 40 can be constructed, as seen in FIG. 5, by providing a cover 105 at a fixed location over a portion of the actuator 48 lying within the channel 94. The location of the fixed cover 105 will determine the triggering force necessary to activate the indicating means. For example, by locating the cover 105 nearer the first end 60, the triggering force will be increased, and vice versa. In this manner, "preset" indicating means can be provided for a given standard size of buoyant vessel As best seen in FIG. 3, a cap 24 is provided for retaining the indicating means 40 within the buoyant vessel 20, and for closing the mouth 26 of the buoyant vessel 20. The cap 24 can be a standard cap of the variety typically provided with soft drink containers, or more preferably, can be a specially fabricated cap for use in connection with the jug fishing apparatus 10 of the present invention. The cap 24 preferably comprises threads 108 for engaging the threaded portion of the mouth 26 of the buoyant vessel 20. The cap 24 preferably also includes a conical portion 110 for greater strength and durability. The lower portion of the actuator 48 extends through a hole 112 in the cap 24 with a sliding fit. An improved seal can be obtained through the use of a gasket 58 which fits around the actuator 48 and seats in a recess 114 inside the cap 24. By providing a gasket 58 which is slightly thicker than the depth of the recess 114, the gasket 58 will be compressed somewhat when the cap 24 is threaded onto the buoyant vessel 20 and tightened. This "preload" or compression causes the gasket to swell somewhat around the actuator 48, thereby providing an improved seal.

In use, the present invention is assembled as described above. The tension adjustment means 54 is set by moving the friction ring 104 to the desired location along the exterior surface 65 of the housing 42. The proper positioning of the friction ring 104 may be facilitated by providing a graduated scale along the exterior surface 65 of the housing 42, which scale can show the range of adjustment and suggested settings for various sizes of buoyant vessel 20, and/or for various fishing conditions and strategies. The indicating means 40 is then inserted into the mouth 26 of a buoyant vessel 20. The cap 24 is threaded onto the mouth 26 of the buoyant vessel 20 and tightened.

If more than one jugfisherman will fish in an area, it is preferable for each fisherman to "color-code" his jugs. This can be achieved by utilizing light bulb or jugs of a single color, or by placing a sheet of colored acetate film or other colored material within the jug, between the light bulb and the jug. In this manner, the fishermen will be able to tell who has caught a fish by the color of the jug which is lighted.

The setting of the triggering force necessary to activate the indicating means can be tested by placing the jugfishing apparatus 10 in the water with the eyelet end 82 of the actuator 48 submerged. When the eyelet 82 is pulled downward into the water, the jugfishing apparatus should be able to be pulled downward by the eyelet 82 until the buoyant vessel 20 is substantially submerged before the buoyancy of the buoyant vessel 20 overcomes the triggering force set by the tension adjustment means and activates the signaling device. If necessary, the friction ring 104 can be adjusted as necessary to set the triggering force as desired by the fisherman.

A length of fishing line 16 then is attached to the eyelet 82, a fishhook 18 is attached and baited, and the entire jugfishing apparatus 10 is dropped into the water. When a fish begins to play with the baited hook, the fisherman may be able to observe the buoyant vessel 20 swiveling or gyrating in the water. When a fish strikes the baited hook with a sufficient triggering force to overcome the tension adjustment means and move the actuator 48 from the first position to the second position, as described above, the signaling means is activated. The signaling means thereafter remains activated, indicating the fish strike to the fisherman. The fisherman then retrieves the jugfishing apparatus 10 and, hopefully, a fish hooked thereon. In the event that the fish was not hooked and has stolen the bait, the fisherman simply rebaits his hook and returns the jugfishing apparatus to the water.

While the invention has been disclosed in its preferred forms, it will be apparent to those skilled in the art that many modifications, additions, and deletions can be made therein without departing from the spirit and scope of the invention as set forth in the following claims.

What is claimed is:

1. A fishing device comprising an indicating means for indicating a fish strike, said indicating means comprising:
    (a) a housing comprising a first end and a second end;
    (b) a signaling device mounted on said housing adjacent said first end;
    (c) a power source having first and second electrodes, said first electrode being in electrical contact with said signaling device; and
    (d) an electrically conductive actuator having a first contact portion adjacent said first end of said housing for contacting said signaling device, and a second contact portion adjacent said second end of said housing and in electrical contact with said second electrode, said actuator being movable between a first position and a second position;
   wherein said first contact portion of said actuator moves into contact with said signaling device when said actuator is in said second position, and said first contact portion of said actuator moves out of contact with said signaling device when said actuator is in said first position.

2. The fishing device of claim 1, wherein said housing is hollow and further comprises an outer surface and an inner chamber, said outer surface comprising a channel extending longitudinally from adjacent said first end to adjacent said second end, and wherein a portion of said actuator is within said channel.

3. The fishing device of claim 2, further comprising an electrically conductive ballast element adapted to be received within said housing at said second end between said second electrode and said second contact portion.

4. The fishing device of claim 3, wherein said ballast comprises a projection adapted to be received within a keyway in said second end of said housing, thereby preventing said ballast from rotating relative to said housing.

5. The fishing device of claim 4, wherein said signaling device comprises a light bulb.

6. The fishing device of claim 5, further comprising a translucent colored element adjacent said light bulb.

7. The fishing device of claim 4, further comprising a cap for retaining said indicating means within a buoyant vessel, said cap comprising threads for engaging a threaded portion of the buoyant vessel, an opening for permitting a portion of said actuator to pass through said cap, and a substantially conical reinforcement portion.

8. The fishing device of claim 7 wherein said cap further comprises a recess and wherein said fishing device further comprises a compressible gasket adapted to fit within said recess in said cap, said gasket being compressed between said cap and said housing when said cap is installed on the buoyant vessel, thereby forming a seal between said opening and the portion of said actuator passing therethrough.

9. The fishing device of claim 8 wherein said second end of said housing further comprises a lip for engaging a mouth portion of the buoyant vessel, and wherein said fishing device further comprises an O-ring which forms a seal between said housing and the buoyant vessel.

10. The fishing device of claim 4 farther comprising means for adjusting the resistance of said actuator to movement from said first position to said second position.

11. The fishing device of claim 10, wherein said means for adjusting comprises a ring mounted on said outer surface of said housing, said ring retaining a portion of said actuator within said channel.

12. The fishing device of claim 11, wherein said ring is movable along a continuous range on said outer surface of said housing, from adjacent said first end to adjacent said second end.

13. The fishing device of claim 12, wherein said means for adjusting further comprises an obliquely angled portion of said actuator and an opposed obliquely angled face on said housing, said ring retaining said angled portion of said actuator in engagement with said angled face.

14. An indicating device for use with a buoyant object, and for indicating a fish strike, said indicating device comprising:
    (a) a housing comprising means for engaging a portion of a buoyant object;
    (b) a signaling device switchable between a non-activated state and an activated state;
    (c) an actuator movable, responsive to a fish strike, between a first position wherein said signaling device is in said non-activated state and a second position wherein said signaling device is in said activated state; and
    (d) adjustment means for varying the resistance to movement of said actuator between said first position and said second position;
       wherein said adjustment means comprises first and second inclined surfaces slideable along one another and means for applying a variable force to retain said first inclined surface against said second inclined surface;
       wherein said first inclined surface comprises a portion of said actuator and said second inclined surface comprises a portion of said housing and wherein said means for applying a variable force comprises means for retaining said actuator against said housing; and
    wherein said means for retaining comprises a ring element adapted to engage said actuator and said housing and to slide along said housing toward and away from said first and second inclined surfaces.

15. The indicating means of claim 14, wherein said signaling device comprises a light bulb and at least one battery.

16. The indicating means of claim 14 further comprising an electrically conductive ballast between said actuator and said at least one battery.

17. A fishing device comprising:
    (a) a buoyant vessel having a mouth opening and a cap for covering said mouth opening;
    (b) an indicator means for indicating a fish strike, said indicator means comprising a housing having first and second ends, said second end adapted to engage the mouth opening of said buoyant vessel, at least one battery within said housing and having first and second electrodes, a light bulb having a ring contact and a tip contact and being mounted on said first end of said housing whereby said tip contact is in electrical contact with said first electrode of said battery, an electrically conductive ballast adjacent said second end of said housing and in electrical contact with said second electrode and an electrically conductive actuator having a first contact portion comprising a first inclined surface adjacent said first end of said housing and a second contact portion contacting said ballast, said actuator being movable between a first position wherein said first contact portion does not contact said light bulb and said light bulb is not illuminated, and a second position wherein said first contact portion contacts the ring contact of the light bulb and said light bulb is illuminated;

(c) continuous adjustment means for varying a triggering force necessary to move said actuator from said first position to said second position, said adjustment means comprising a second inclined surface comprising a portion of said housing, said second inclined surface engaging said first inclined surface with a contact pressure, said adjustment means further comprising a ring for retaining a portion of said actuator against said housing, said ring being movable toward and away from said first and second inclined surfaces, thereby varying the contact pressure;

(d) a length of fishing line having a first end and a second end, said first end of said length of fishing line being connected to a portion of said actuator; and (e) a fishhook attached to said second end of said length of fishing line;

whereby when a fish contacts said fishhook with a force at least equal to the triggering force, said actuator is moved from the first position to the second position and said light bulb illuminates.

\* \* \* \* \*